US012328136B2

(12) United States Patent
Hou et al.

(10) Patent No.: US 12,328,136 B2
(45) Date of Patent: Jun. 10, 2025

(54) CONNECTORS AND PROTECTIVE CASE OF A HAND-HELD DEVICE HAVING SAME

(71) Applicant: Evolutive Labs Co., Ltd., Taipei (TW)

(72) Inventors: Pei-Chun Hou, Taipei (TW); Po-Wen Hsiao, Taipei (TW)

(73) Assignee: EVOLUTIVE LABS CO., LTD., Taipei (TW)

( * ) Notice: Subject to any disclaimer, the term of this patent is extended or adjusted under 35 U.S.C. 154(b) by 348 days.

(21) Appl. No.: 17/850,464

(22) Filed: Jun. 27, 2022

(65) Prior Publication Data

US 2023/0318652 A1 Oct. 5, 2023

Related U.S. Application Data

(60) Provisional application No. 63/275,693, filed on Nov. 4, 2021.

(30) Foreign Application Priority Data

Mar. 29, 2022 (TW) ................................. 111112014

(51) Int. Cl.
| | |
|---|---|
| *H04B 1/38* | (2015.01) |
| *A45C 11/00* | (2006.01) |
| *A45F 5/00* | (2006.01) |
| *H04B 1/3888* | (2015.01) |

(52) U.S. Cl.
CPC ............ *H04B 1/3888* (2013.01); *A45C 11/00* (2013.01); *A45F 5/00* (2013.01); *A45C 11/002* (2025.01); *A45F 2005/006* (2013.01); *A45F 5/1516* (2025.01)

(58) Field of Classification Search
CPC . H04B 1/3888; A45C 11/00; A45C 2011/002; A45F 5/00; A45F 2005/006; A45F 2200/0516; F16M 11/045; F16M 11/08; F16M 13/04; F16M 11/046; H04M 1/185; H04M 1/05; H04M 1/18; H04M 1/06
See application file for complete search history.

(56) References Cited

U.S. PATENT DOCUMENTS

| | | | |
|---|---|---|---|
| 6,584,655 B1* | 7/2003 | Cardwell, III | F16B 35/00 24/324 |
| 10,790,868 B1* | 9/2020 | Tsai | A45F 5/00 |
| 11,950,667 B2* | 4/2024 | Drake | A45C 3/06 |
| 2006/0150375 A1* | 7/2006 | Moore | A45F 5/00 24/299 |

FOREIGN PATENT DOCUMENTS

| | | |
|---|---|---|
| CN | 212811786 U | 3/2021 |
| CN | 213367881 U | 6/2021 |
| JP | 2019220804 | 12/2019 |

* cited by examiner

*Primary Examiner* — Fayyaz Alam
(74) *Attorney, Agent, or Firm* — Muncy, Geissler, Olds & Lowe, P.C.

(57) ABSTRACT

The invention relates to a connector for connecting a protective case of a hand-held device and a lanyard. The protective case comprises a frame with a slot formed on the frame. The connector has a fastening portion and a lanyard ring. The fastening portion is placed in the slot, and the lanyard ring extending from the fastening portion reveals out of the slot for the lanyard to be disposed therethrough. The invention also relates to a protective case for a hand-held device comprising two of the afore-mentioned connectors.

32 Claims, 15 Drawing Sheets

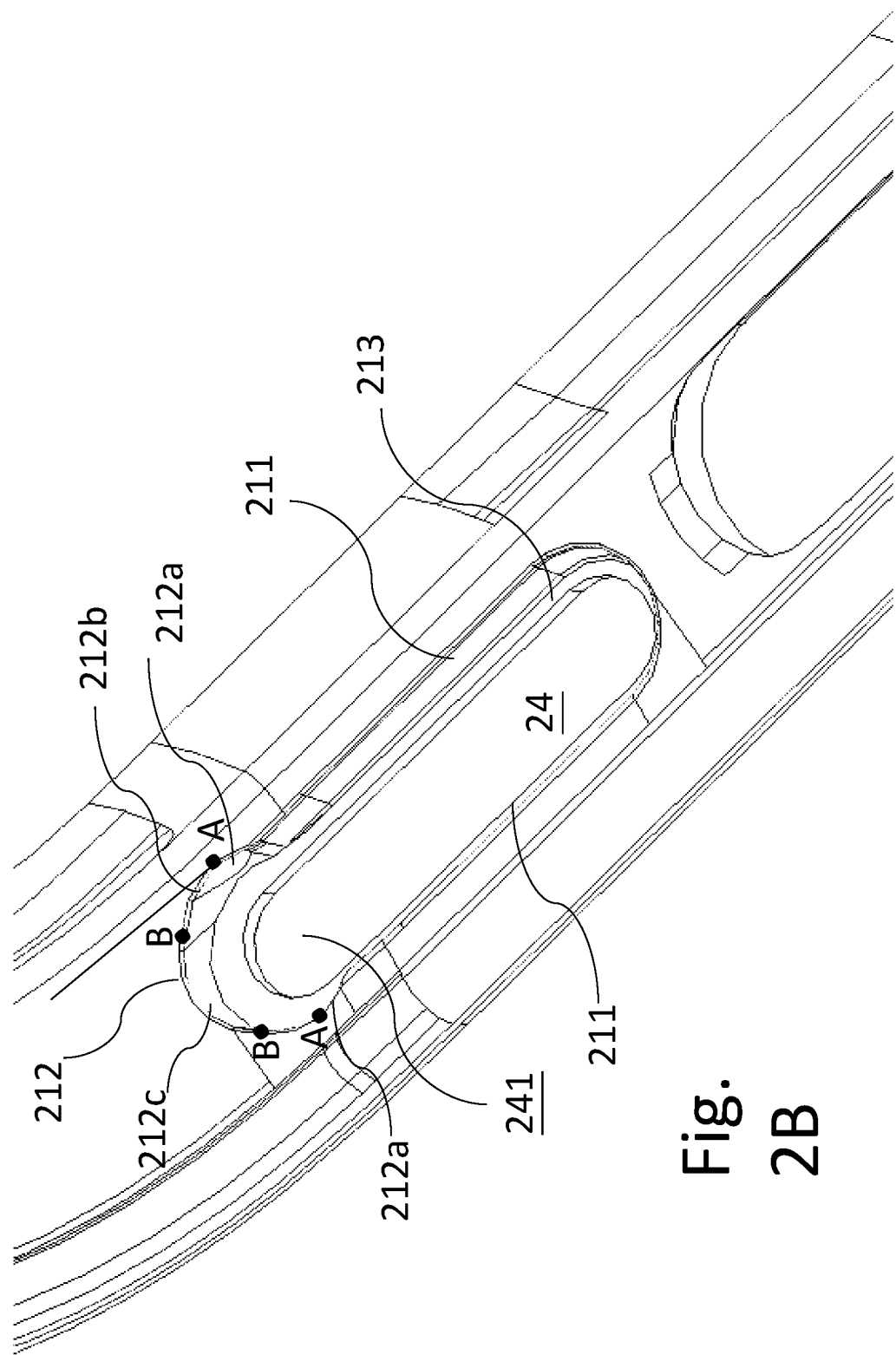

CONNECTORS AND PROTECTIVE CASE OF A HAND-HELD DEVICE HAVING SAME

CROSS-REFERENCES TO RELATED APPLICATIONS

This application claims priorities to Taiwan Patent Application No. 111112014 filed on Mar. 29, 2022 and U.S. Provisional Patent Application No. 63/275,693 filed on Nov. 4, 2021.

BACKGROUND OF THE INVENTION

Field of the Invention

The invention is used with a protective case for housing a hand-held device (e.g., a mobile phone or a tablet) to let a user connect a neck or hand lanyard/lanyards to the protective case.

Descriptions of the Related Art

For hands free, the protective case of a hand-held device (such as a mobile phone or a tablet) designed with a lanyard style is loved by consumers, particularly women, because unlike men often having a pocket for putting in their cell phone, women, for the love of beauty, do not want to put their mobile phone in the pocket to have their clothes look wrinkled, influencing their appearance, and also do not want put the mobile phone into the bag, resulting in inconvenience on access. Therefore, a phone case coming with a lanyard becomes their preference. If the color or style of the lanyard or connector can better match the user's clothes, the exposed phone or tablet can become a decorative accessory similar to a small bag, which will arouse their strong desire to buy.

Currently, the connection mode between a lanyard and a mobile phone in the market is nothing more than a single-end connection type or a double-ended connection type. In the single-end connection type, an attaching sheet is inserted to stick between the protective case and the mobile phone, and a lanyard ring is extended outwards to connect a lanyard. The double-ended connection type is provided with two connecting rings on the lower back of two sides of the protective case to connect the two ends of the lanyard. The traditional single-end connection type resulting in the imbalance of the mobile phone, will also cause the poor suspension stability If lanyard is accidentally broken or its connection portion is damaged, the user may be easy to lose the mobile phone. This frequently occurs in the exciting activities of an amusement park. Therefore, customers gradually tend to choose the design the double-ended connection type, to overcome the shortcomings of the single-end connection type. However, the products of the double-ended connector type still have their limitations. The biggest problem is that the connector must be fixed to the phone case. That is, the phone case must be specially designed to be ready for use with a lanyard. This means that the connector must already be built with the phone case (usually near the lower corner of the phone case). If it is necessary to remove the lanyard sometimes, the connector still exists on the phone case, which is extremely uncomfortable and uneven when the phone is put on a flat surface. There is no flexibility in use. In addition, if the mobile phone connector is built with a soft silicone rubber phone case, after a period of time, the aging of the rubber causes the connection portion to be easily broken, which even increases the risk of the mobile phone to fall out from the case, or the phone case needs be replaced because of its ugly appearance.

Therefore, to design a comprehensive mechanism to solve the above problems will be a great breakthrough in the field of mobile phone accessories.

SUMMARY OF THE INVENTION

In the existing design, there has been a phone case that is built with a lanyard having a double-ended connection. However, if a slot can be created on the existing phone case to be ready for receiving a connector into the slot, the expected function can be achieved. If this connector can be removed when no longer in use, the mobile phone case can still keep clean and plain. It will be more perfect to get the desired and extra purposes.

Preferably, since the existing power charging jack, data transmission jack, or a jack which can perform power charge and data transmission (all referred to as "charge/data jack") is usually located at the center of the bottom of the phone with two audio openings (for microphone or speaker) on either side. Therefore, for a phone case design, the center and each of its sides of the bottom frame can be hollowed to expose the charge/data jack, and the speaker or microphone, respectively. That is, the bottom frame of the protective case can be formed with three ready-made slots, namely a center charge/data slot which does not block a charge/data cable to go through, and two audio slots at each side of the charge/data slot to firmly receive two specifically designed connectors, respectively. If those connectors can be disassembled when not being in use, the design will be even better to achieve multi-functions.

If the built-in slots which have inherently existed on the protective case can be further customized to better fit with the specific connectors (e.g., inner sidewalls defining the slot are profiled to conform to a portion of the connector in shape and dimension), the integrity of the product can be greatly improved.

In the sale aspect, because contrary to the conventional design that all mobile phone cases with fixed lanyard and connectors have complex parts, the volume of packaging using this invention will not change, when being displayed. The product packaging can easily advertise "Hands Free", "Bag-look mobile phone", "Free On-off Lanyard Ring", "Color Changeable Lanyard Ring", "Lanyard Free, Trouble Free" to get a better eye-catching. For sales, the packaging can be with a number of different colored connectors (including lanyard rings) for replacement, which will break away from the traditional style, increase the eye-catching and greatly enhance the purchase desire.

The objective of this invention is to provide a connector being adapted to retain a lanyard to a protective case of a hand-hand device. The protective is formed with a slot. The connector has a fastening portion and a lanyard ring. The fastening portion is assembled with the slot. The lanyard ring extends from the fastening portion and protrudes out of the slot so that a lanyard is adapted to pass through the lanyard ring.

Another objective of this invention is to provide a protective case of a hand-held device which includes two the afore-mentioned connectors.

Yet another objective to provide a connecting device being adapted to retain a lanyard onto a protective case of a hand-hand device. The protective case is formed with two slots; and the connecting device has two connectors and a bridge. Each connector has a fastening portion and lanyard ring extending from the fastening portion. The two connectors are assembled with the two slots through the two fastening portions, and two lanyard rings extend out of the two slots, respectively, thereby a lanyard is adapted to pass through the rings. The bridge connects between the two fastening portions of the connectors.

Yet a further objective of this invention is to provide a protective case of a hand-held device, which includes an afore-mentioned connecting device.

BRIEF DESCRIPTION OF THE DRAWINGS

FIG. 2B is an enlarged partial view showing the left side audio slot of the second embodiment of this invention.

DESCRIPTION OF THE PREFERRED EMBODIMENT

Generally speaking, in a handheld device which is housed by a protective case, its audio slot(s) and charge/data jack must be exposed through the protective case. Because this is common, each embodiment to be illustrated no longer shows the handheld device itself. The technical focus of this invention is that a slot is formed on the frame of the protective case of the handheld device (taking a mobile phone case as an example). Of course, the slot is not limited to be formed on the frame, any places of the case that can be reasonably opened a slot or slots are feasible. All of the following embodiments uses the slot typically formed on the frame for illustration examples. And, preferably, the slot(s) already exist on the phone case that already has a function, such as the audio slot used to allow sound of the phone's speaker or microphone to come out from or come into the phone. Then, a connector is allowed to be installed in the slot. In the assembling process, the connector is best installed from the inside of the phone case to the outside, and then is stopped against the slot, and will not be separated from falling out from the phone case. The following embodiments illustrate how the above technology is implemented. Each embodiment takes the most typical mobile phone case, namely, the bottom frame has a charge/data slot at the center and audio slots on the two sides. Each audio slot provides the function of playing stereo sound or receiving external sound. As an example, each embodiments uses a connector for each audio slot to achieve a better sense of weight balance when the phone is held by a lanyard or lanyards.

Figure 1A:
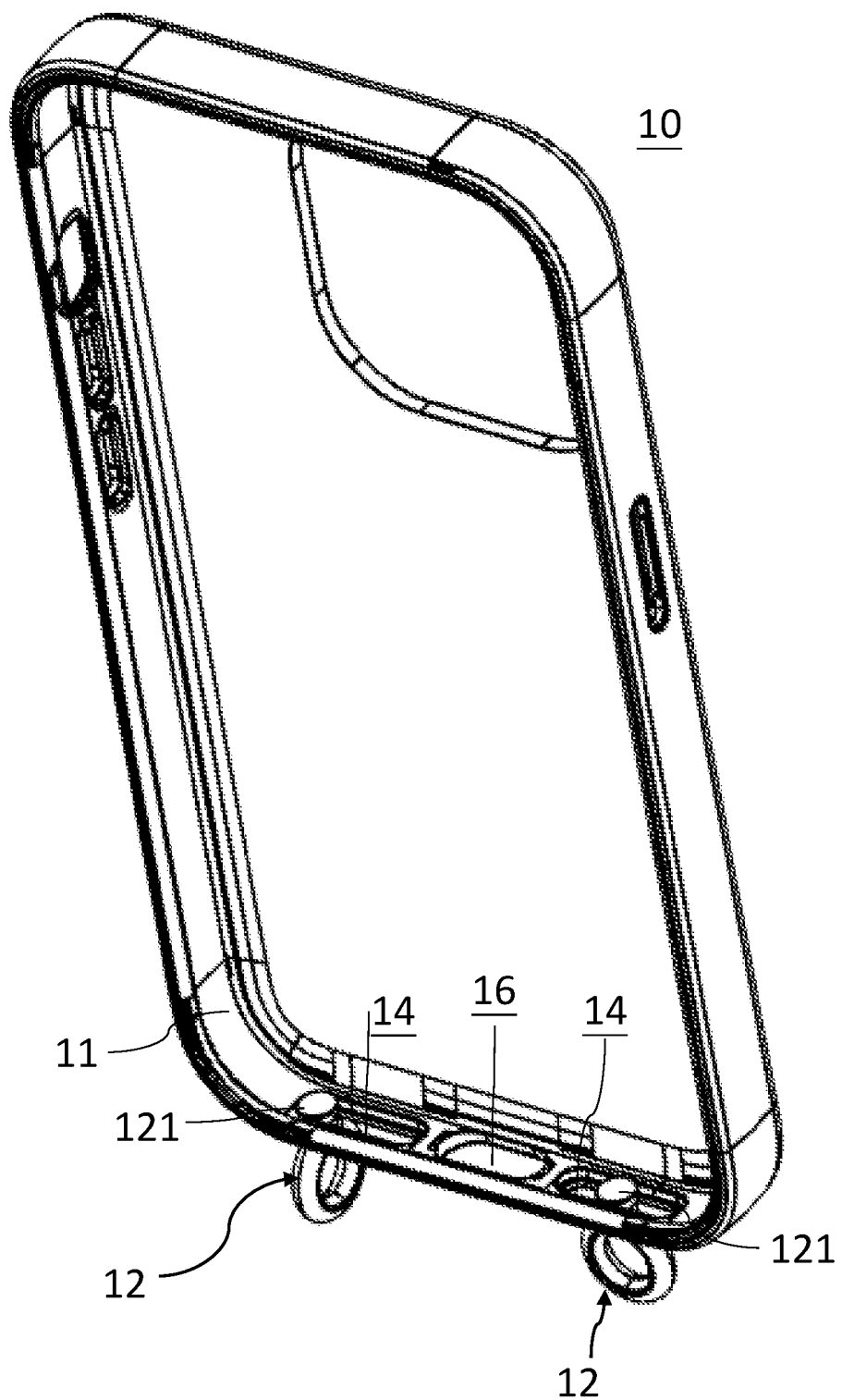
FIG. 1A is a schematic perspective view of the first embodiment of this invention.
Figure 1B:
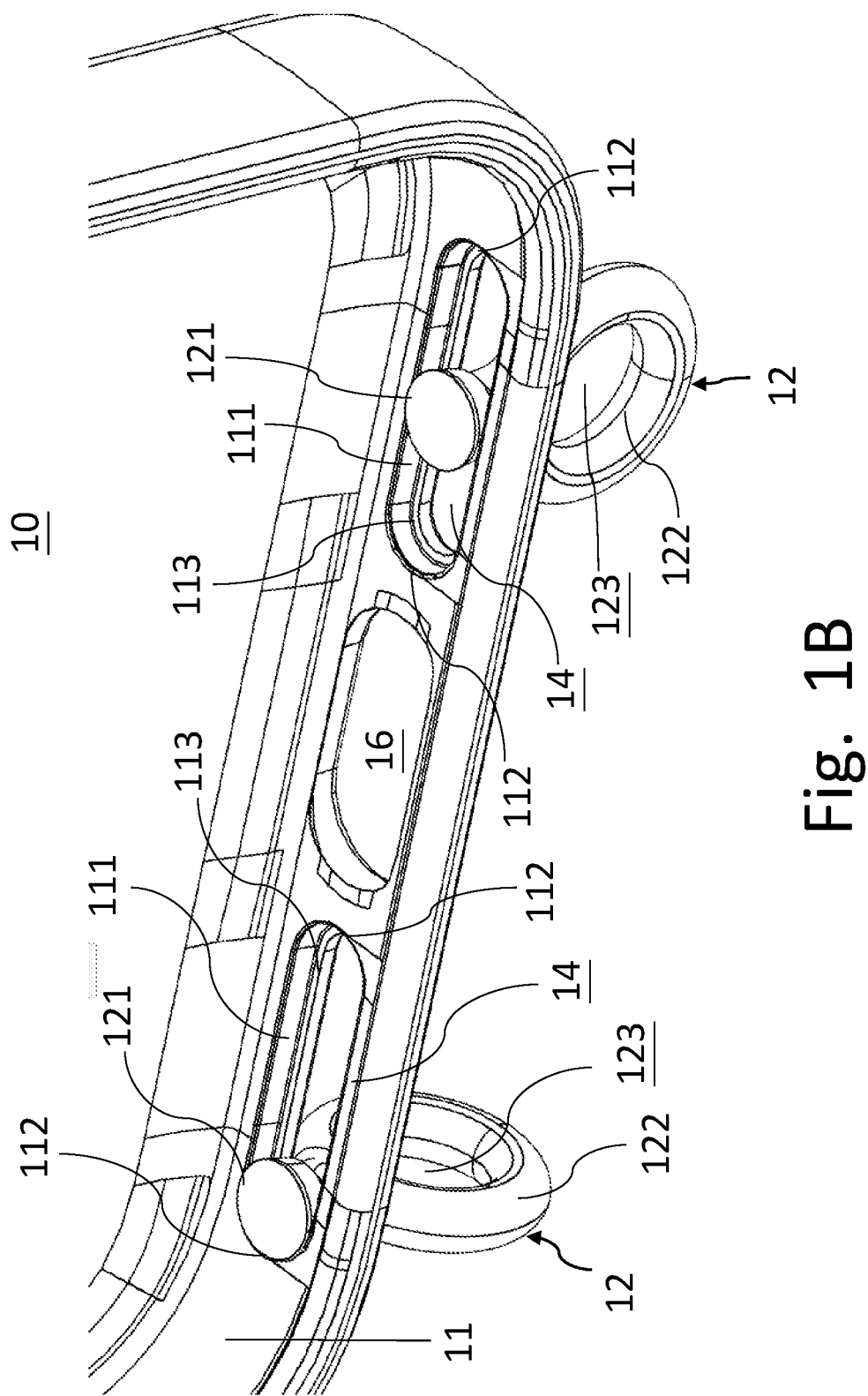
FIG. 1B is an enlarged partial view of the two connectors assembled with the two audio slots as shown in FIG. 1A.
Figure 2A:
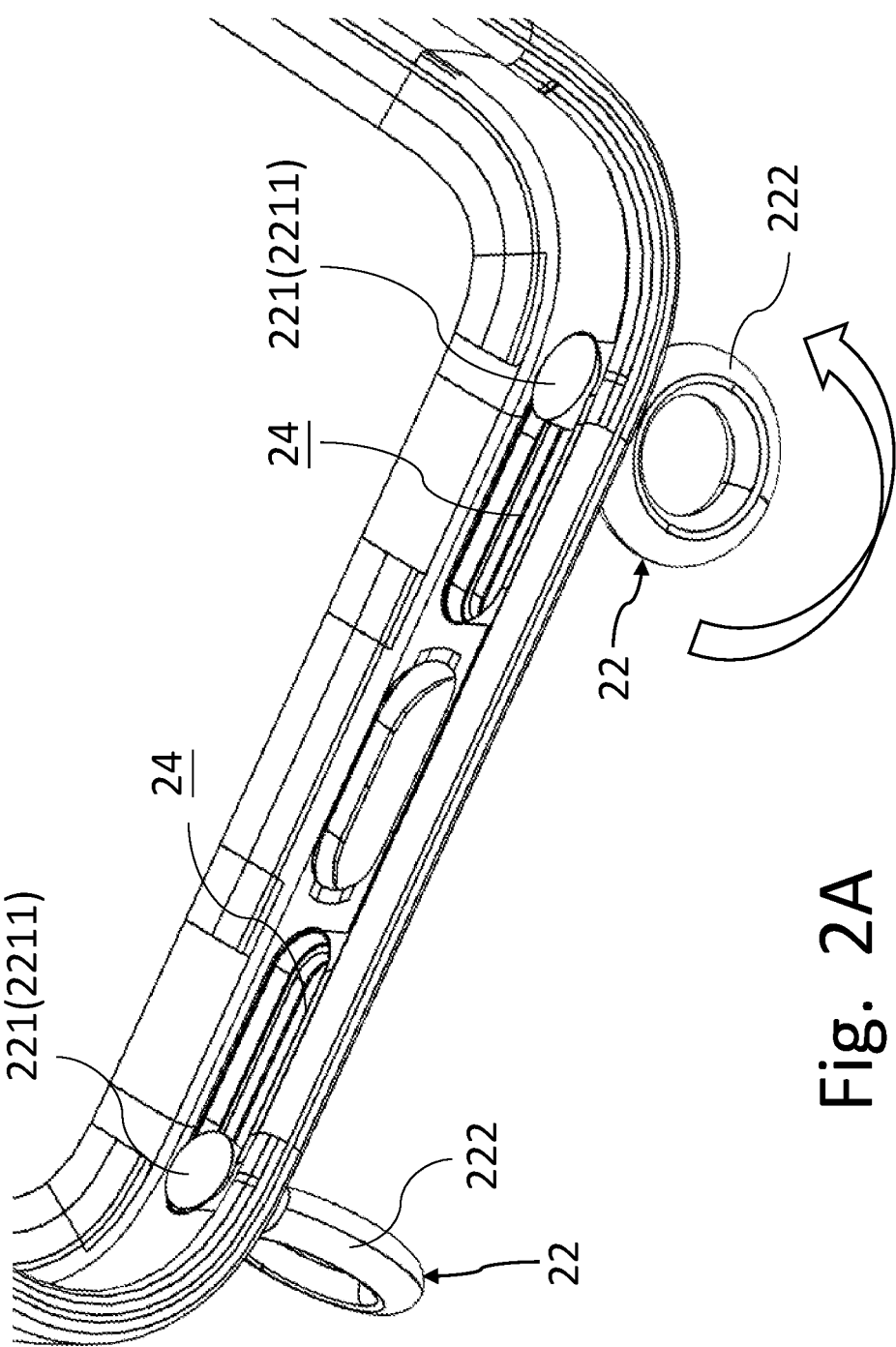
FIG. 2A is an enlarged partial view showing the second embodiment of this invention, wherein the two connectors are assembled with the retaining spaces of the audio slots, respectively.

In the first embodiment, a user can have the connector slide left or right (as shown on the right in FIGS. 1A and 1B) and stop on an outer end portion of a retaining space (as shown on the left in FIGS. 1A and 1B). The point of this embodiment is to produce a "sense of stage" between sliding and stopping. In the second embodiment, a user can have the connector slide left or right and stop on an outer end portion of a retaining space (as shown on the right in FIG. 2A). The connector can be rotated about 90 degrees to be further positioned in a tight fit (such as the state shown by the connector on the left in FIG. 2A). In the third embodiment, the connector is installed directly in a retaining space; however, the connector can be rotated "in a stage manner" and adjusted to a desired angle of the lanyard ring at will. In the fourth embodiment, the two connectors are connected to each other to form a single connecting device, so that the two connectors are positioned in the retaining spaces of the audio slots simultaneously. The above four embodiments will not affect the charging or data transmission of the phone, and will not affect the sound of mobile phone in and out. The following embodiments are respectively explained for greater details, in which the matching structure of the left connector and the left slot is the same as that of the right ones, and only their operational states may be different. So, for the same structure, only the right or the left is selected for illustration. Same structural relations of different embodiments are not repetitive and same elements share common reference numerals for simplicity. However, these do not mean any restrictions such as that the matching of the connector and slot must be the same or symmetrical with each other for the left and for the right of the center slot.

In the first embodiment as shown in FIGS. 1A and 1B, for use with a hand-held device, a protective case 10 includes a frame 11 and two connectors 12 for holding a lanyard (not shown). The frame 11 is formed with two slots, preferably two audio slots 14 each corresponding to an audio device of the hand-held device, such as a speaker or a microphone, thereby sound is capable of coming out or into the phone through the audio slots 14. Each connector 12 has a fastening portion 121 and a lanyard ring 122. The fastening portion 121 is assembled with the audio slot 14. The lanyard ring 122 extends from the fastening portion 121 and out of the audio slot 14, thereby a lanyard can pass through a hole 123 of the lanyard ring 122. Preferably, the fastening portion 121 is assembled with the audio slot 14 in a detachable manner. The frame 11 has a charge/data slot 16 formed thereon, in which the charge/data slot 16 is aligned with a charge/data jack of the hand-held device (not shown), and adjacent to the audio slot 14.

Figure 1C:
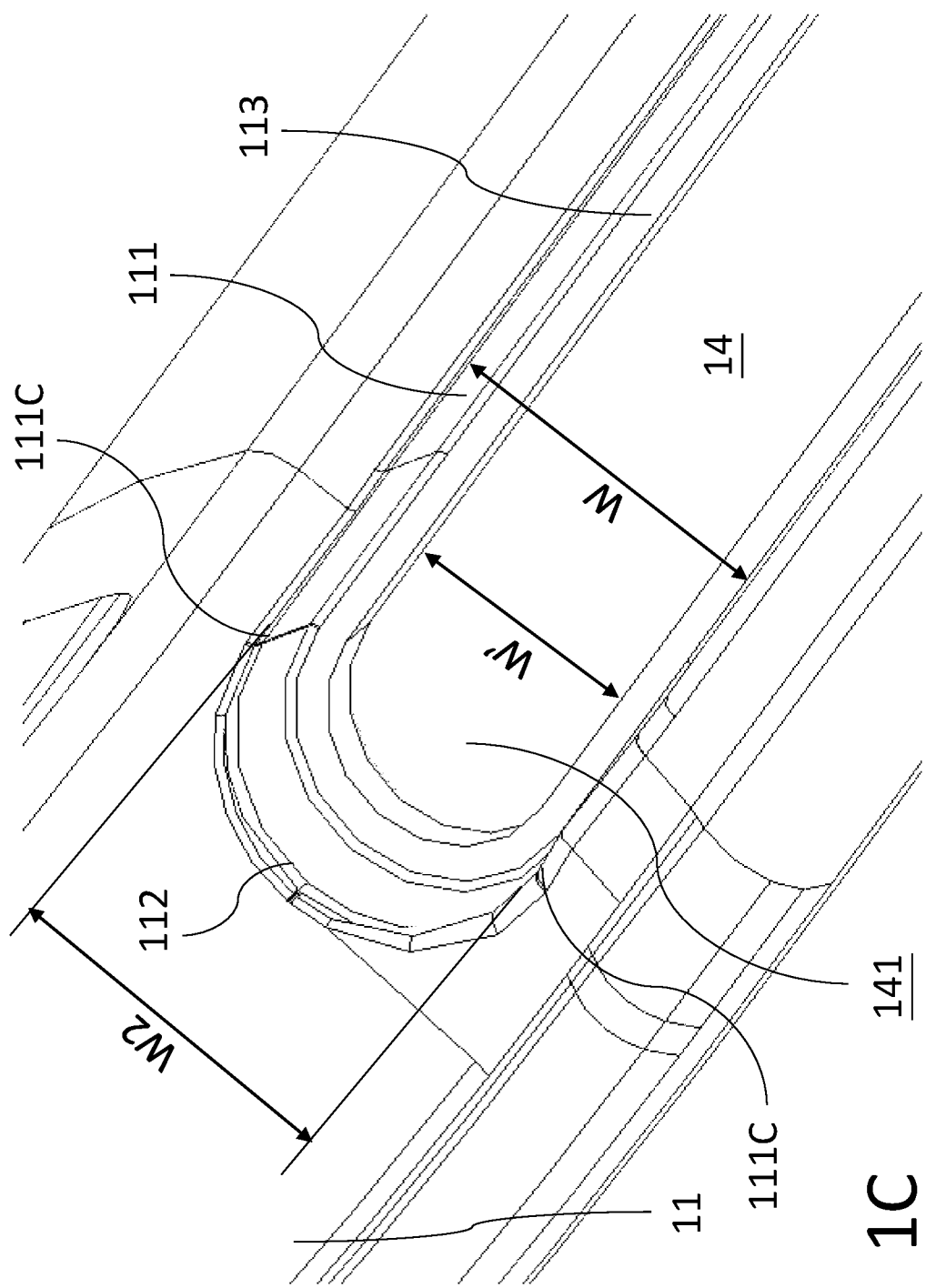
FIG. 1C is an enlarged partial view of the left-side audio slot as shown in FIG. 1A.
Figure 1D:
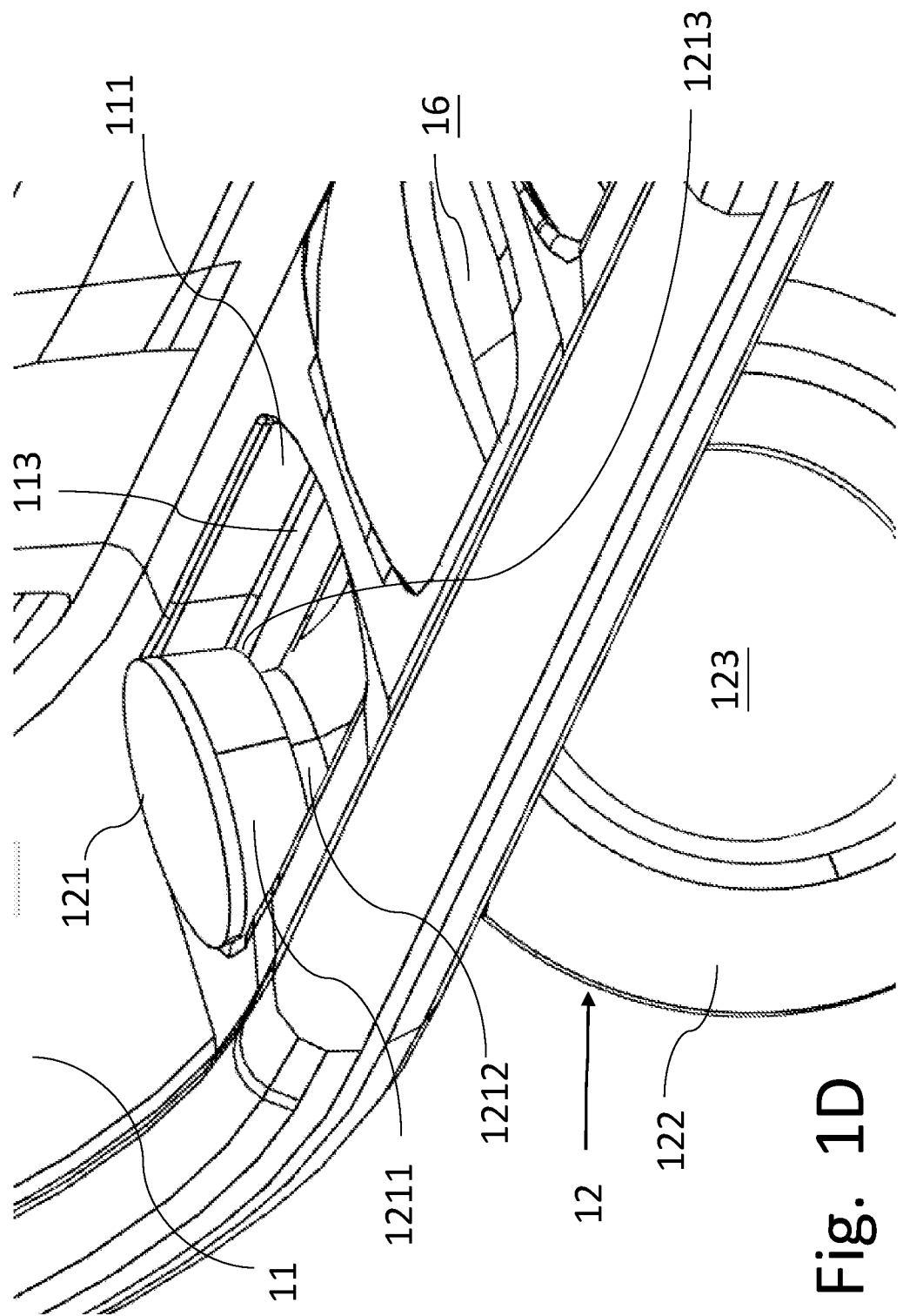
FIG. 1D is an enlarged partial view of the connector assembled with the left-side audio slot as shown in FIG. 1A.
Figure 1E:
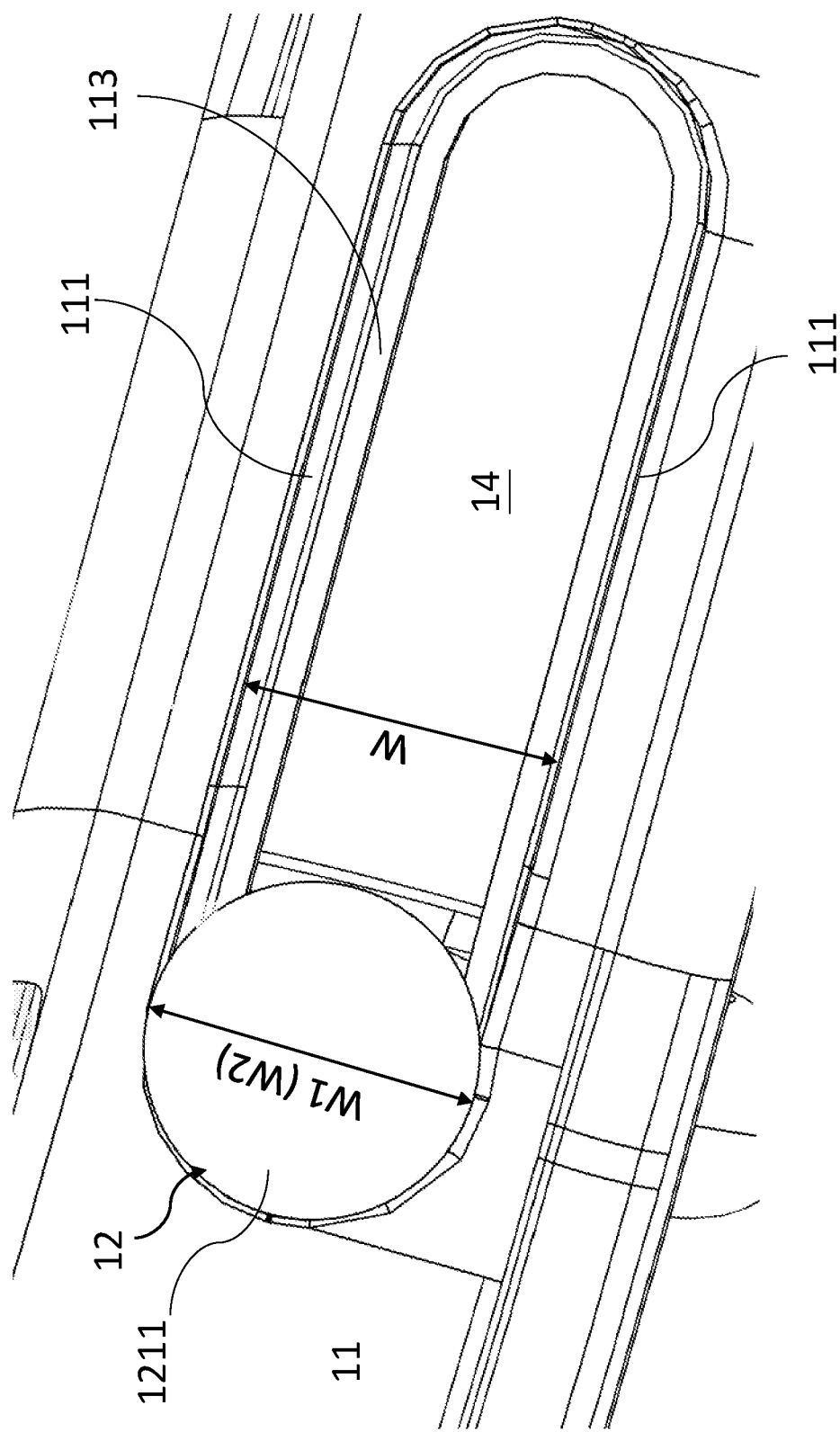
FIG. 1E shows the dimensional relation of the connector when being placed in the retaining space as shown FIG. 1D.

Further in reference to FIGS. 1C and 1D altogether, the fastening portion 121 comprises a head 1211 and a neck 1212 which is between the head 1211 and the lanyard ring 122. The audio slot 14 is shaped elongated and defined by two opposing sidewalls 111 and two opposing end portions 112 altogether. The two sidewalls 111 and the two end portions 112 are continuously provided with a peripheral step 113, thereby making the audio slot 14 be a countersunk slot. When the fastening portion 121 is assembled in the audio slot 14, most of the head 1211 is embedded in the audio slot 14 and the head 1211 formed with a bottom 1213 resisting against the step 113, thereby the connector 12 firmly engage with the protective case 10, as shown in FIG. 1D. In this embodiment, where the lanyard ring 122 connects to the neck 1212 has a diameter greater than a distance W' defined by the opposing sidewalls 111 below the step 113. Therefore, when the fastening portion 121 is assembled within the audio slot 14, the neck 1212 is just located between the two sidewalls 111 below the step 113, whereby where the lanyard ring 122 connects to the neck 1212 resists against the place that the step 113 is formed on, unless an inward force is exerted on the connector 12, the connector 12 cannot be easily separated inward from the protective case 10. There is a retaining space 141 formed on any area of the audio slot 14 (e.g. on an outer end portion 112 of the audio slot 14 as shown in FIG. 1C) to position the connector 12 within the audio slot 14. In this embodiment, the head 1211 is shaped as a conical body and the retaining space 141 is a conical space formed on the outer end portion 112 and corresponding to the head 1211 in shape. At a same height, the head 1211 has a circular diameter W1 which is substantially the same as a diameter W2 of the conical space and slightly greater than a distance W between the sidewalls 111 above the step 113, as shown in FIG. 1C, as well as FIG. 1E. After the connector 12 is assembled within the audio slot 14, it can be moved outward and toward the retaining space 141. Because the diameter W2 is not identical to the distance W, the user may have a "sense of stage" when the connector 12 is close to the retaining space 141 and right after, entered into the retaining space 141 and positioned. Unless the user adds on a relatively force (at least an amount greater than, such as double of the weight of a mobile phone on average), the fastening portion 121 has no sense to be separated from the retaining space 141. To reinforce the positioning stability of the connector 12, the neck 1212 can be alternatively shaped non-circular, for example, an elliptical body whose major axis is slightly greater than the distance W' between the two sidewalls 111 at a level of the step 113. When the connector 12 is assembled within the audio slot 14 and is moved outward and into the retaining space 141, after the connector 12 is rotated at a certain degree, the neck 1212 can tightly fit with the step 113 because the major axis is slightly greater than W', thereby getting a better positioning effect (not shown). For an alternative, in order to get a better "sense of stage" when the connector 12 is moved into the retaining space 141, the two opposing sidewalls 111 proximal to the retaining space 141 can be shrunk inward to form a neck area 111C, followed by being merged into the outer end portion 112. That is, the distance W between the two sidewalls 111 is shrunk at the neck area 111C having a distance slightly less than W, and then expanded into a distance W2 slightly greater than W (as shown in FIG. 1C). This way, the user may feel a small resistance when having the connector 12 go passing the neck area 111C, thereby producing an obvious "sense of stage" to enhance the stability of the connector 12 positioned in the retaining space 141 and the user's operation feel.

Figure 2C:
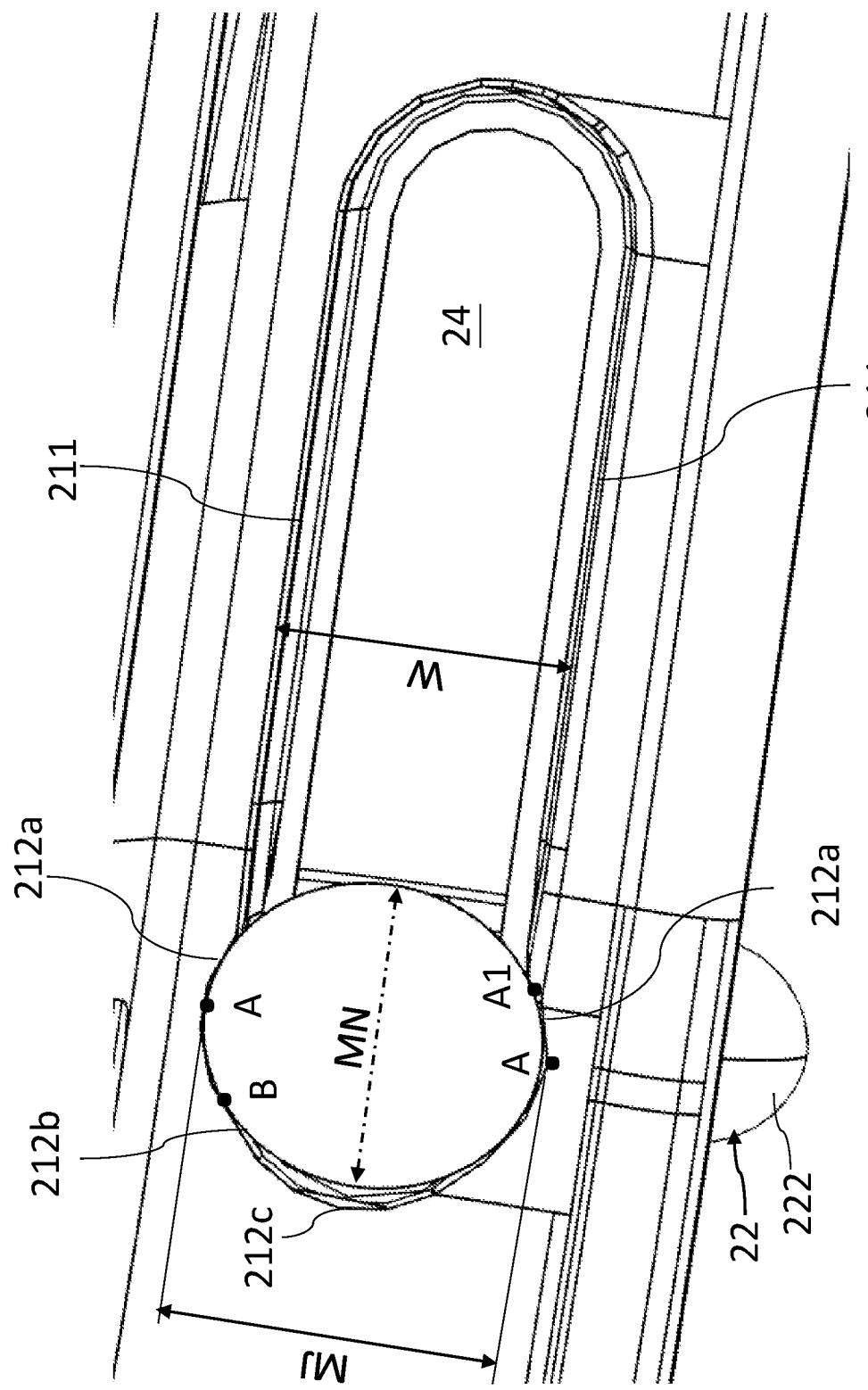
FIG. 2C shows the dimensional relation of the connector when having been placed in the left side retaining space as shown in in FIGS. 2A and 2B.

The following is the description for the second embodiment which is almost the same as the first embodiment except the heads of the fasteners and the retaining spaces matching with the heads are different in shape. Therefore, the description just includes the mentioned differences. As a matter of fact, the connection between the fastener and retaining space is more delicate than that of the first embodiment. In reference to FIG. 2A, on the right, the connector 22 is assembled within the audio slot 24 before being rotated; and on the left, the connector 22 is assembled within the audio slot 24 after being rotated about 90 degrees in position. The left is being taken as an example for illustrating the related structure in details. Further in reference to FIG. 2B, in this embodiment, the retaining space 241 is a space defined by a multi-curvature surface, and formed on one of the two end portions 212. The retaining space 241 is continuously defined by two first wall sections 212a, two second wall sections 212b and a third wall section 212c, in which the two first wall sections 212a are merged with the two sidewalls 211 of the slot 24, respectively, and the two first wall sections 212a oppose to each other and each has an arc shape. The two second wall sections 212b connect with the first two wall sections 212a, respectively, and the third wall section 212c connects between the two second wall sections 212b. Further in reference to FIGS. 2C and 2D, the head 2211 is shaped as an elliptical body in which at the same height, the major axis MJ of the head 2211 is substantially the same as a distance between two first wall sections, i.e., Point A to the other Point A, and greater than a distance between the first wall section 212a and the opposing second wall section 212b, i.e., Point A1 to Point B. The minor axis MN of the head 2211 (which is slightly less than MJ) is substantially not greater than a distance W between the two sidewalls 211 above the step 213.

Figure 2D:
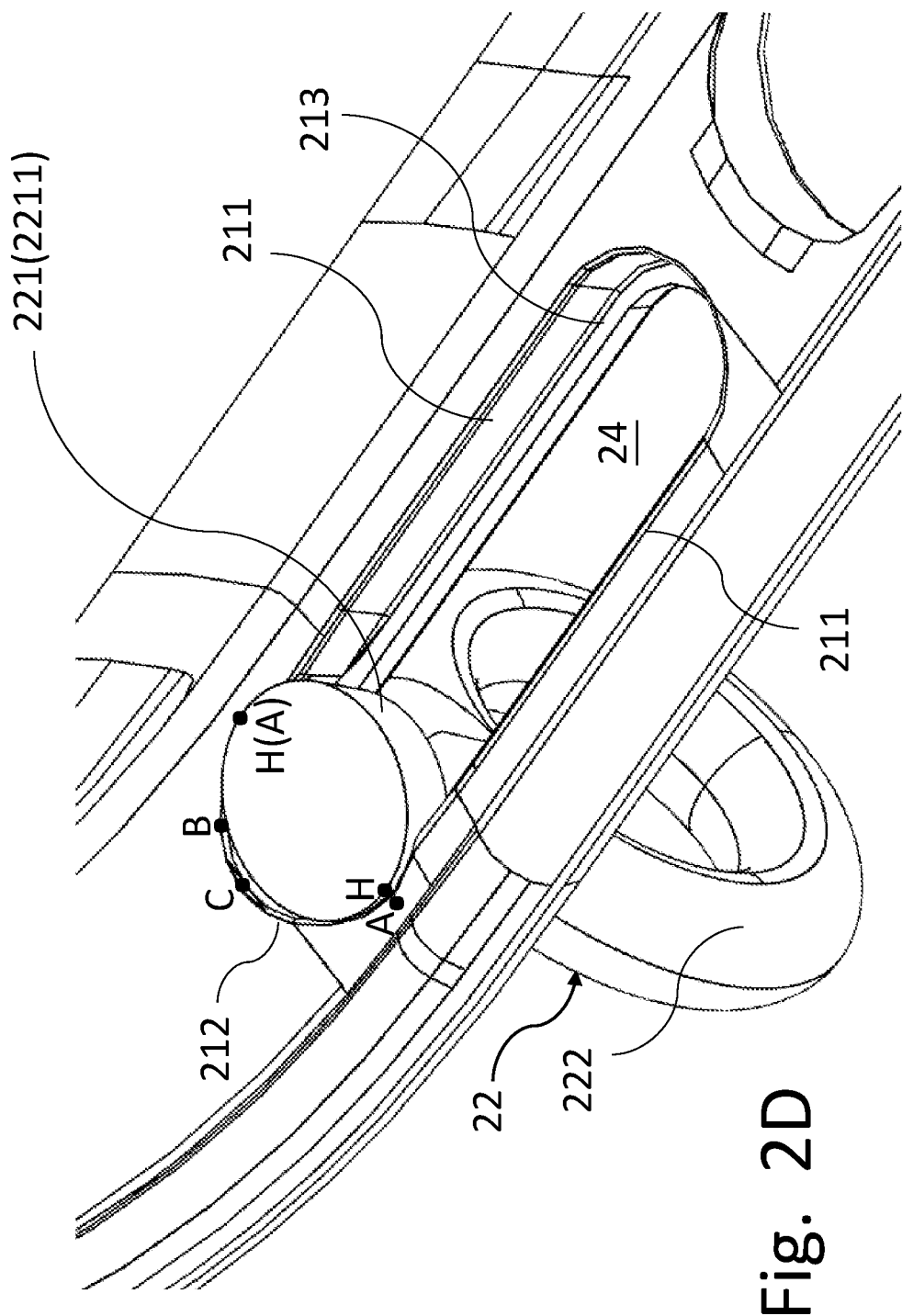
FIG. 2D is an enlarged partial view of FIG. 2A, wherein the connector is placed in the left side audio slot and having been rotated in position.
Figure 2E:
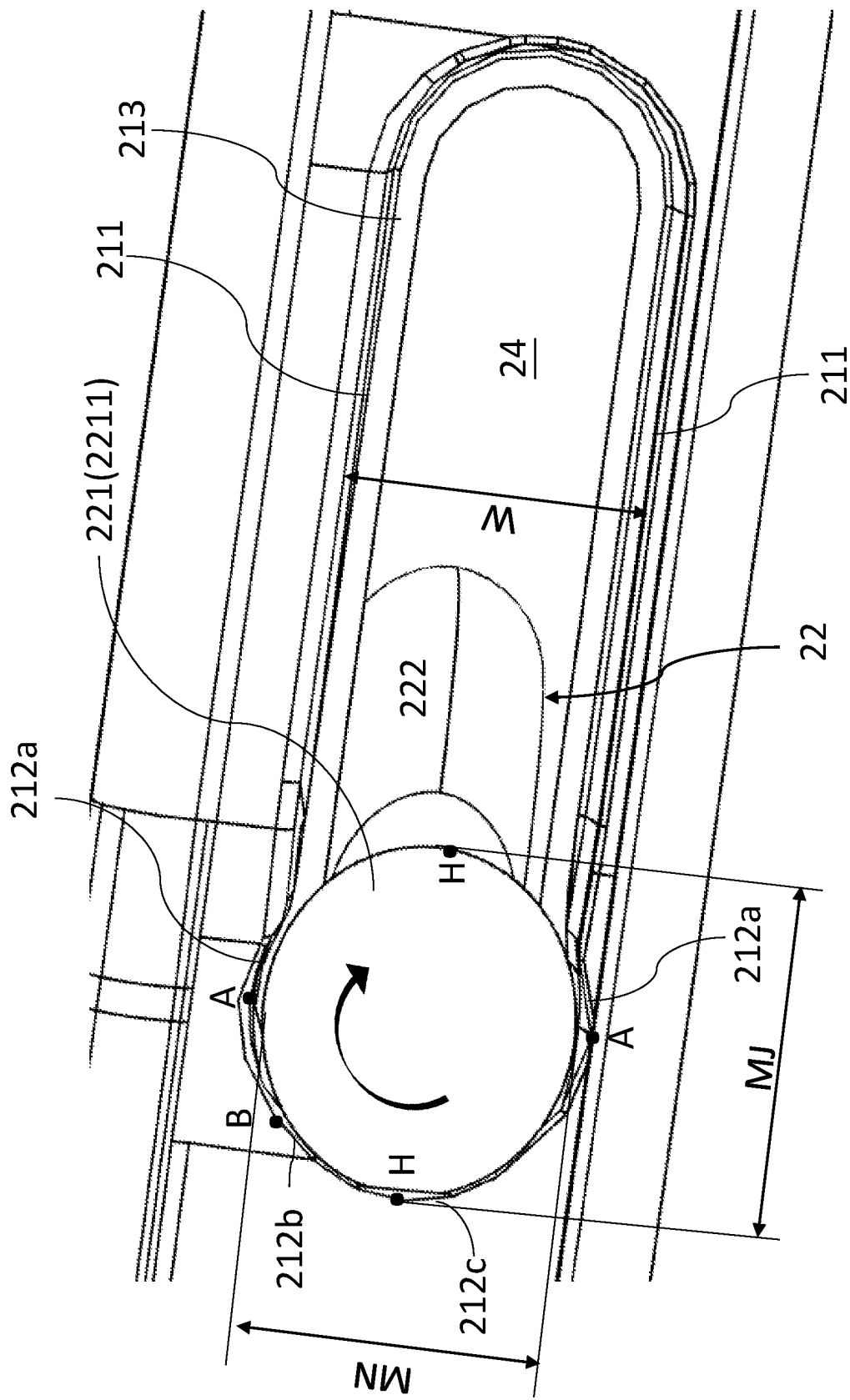
FIG. 2E is an enlarged partial view of FIG. 2A, wherein the connector is placed in the left side audio slot before being rotated in position.

The following is the process as to how the connector 22 is positioned within the slot 24. The right structure of FIG. 2A and the enlarged structure of FIG. 2E are being referenced altogether When the user puts the connector 22 down through the audio slot 24 in a direction that the major axis MJ being parallel to the longitudinal direction, till the head 2211 resists against the step 213 and is unable to keep going downward, because the minor axis MN is not greater than the distance W between the two sidewalls 211 above the step 213, the connector is able to slide outward along a surface of the step 213 and then go into the retaining space 241, and then stop when Point H of the head 2211 reaches the third wall section 212c, as shown in FIG. 2E's state. When the user twists the lanyard ring 222 and the connector 22 is rotated about 90 degrees, Point H runs along the arrow direction as shown in FIG. 2E, passes through Point B of the second wall section 212b, and stops at Point A of the first wall section 212a, whereby the head 2211 is well positioned between the two first wall sections 212a, as the state shown on the right of FIG. 2A, and FIG. 2D. Because the major axis MJ is substantially the same as the distance between two Point As, and greater than the distance between Point A1 and its opposing Point B, the process that Point H of the head 2211 passing through Point B and reaching Point A presents a "sense of stage" from the loosen to tight. Once the connector 22 is positioned to the state as shown in FIG. 2D, it cannot go back to the state as shown in FIG. 2E to be withdrawn from the retaining space 241 unless the user exerts a force to an extent. This sort of design improves the operational quality and product reliability.

Figure 3A:
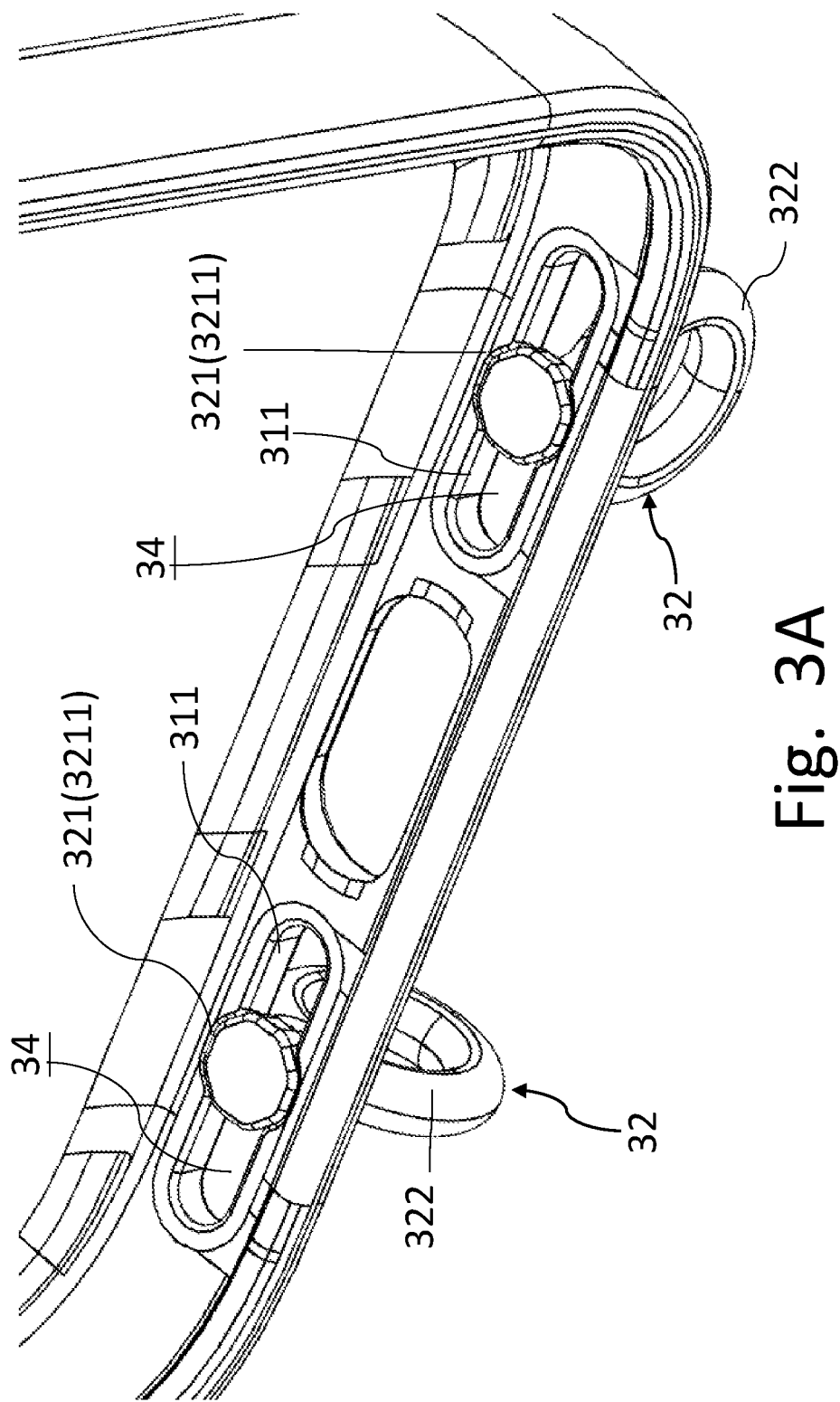
FIG. 3A is an enlarged partial view showing the third embodiment of this invention, wherein the two connectors are assembled with the retaining spaces of the audio slots, respectively.
Figure 3B:
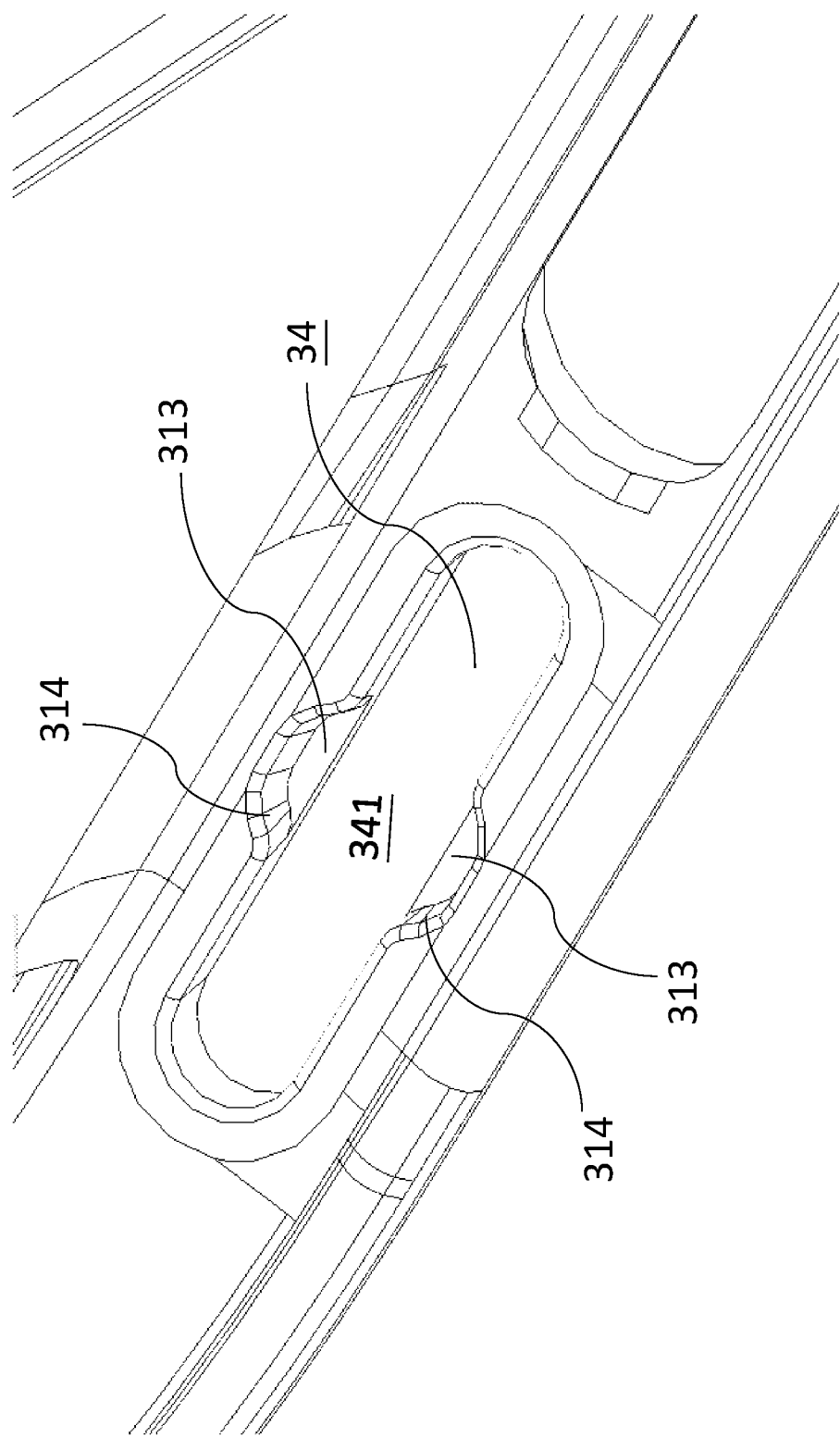
FIG. 3B is an enlarged partial view showing the left side audio slot of the third embodiment of this invention.
Figure 3C:
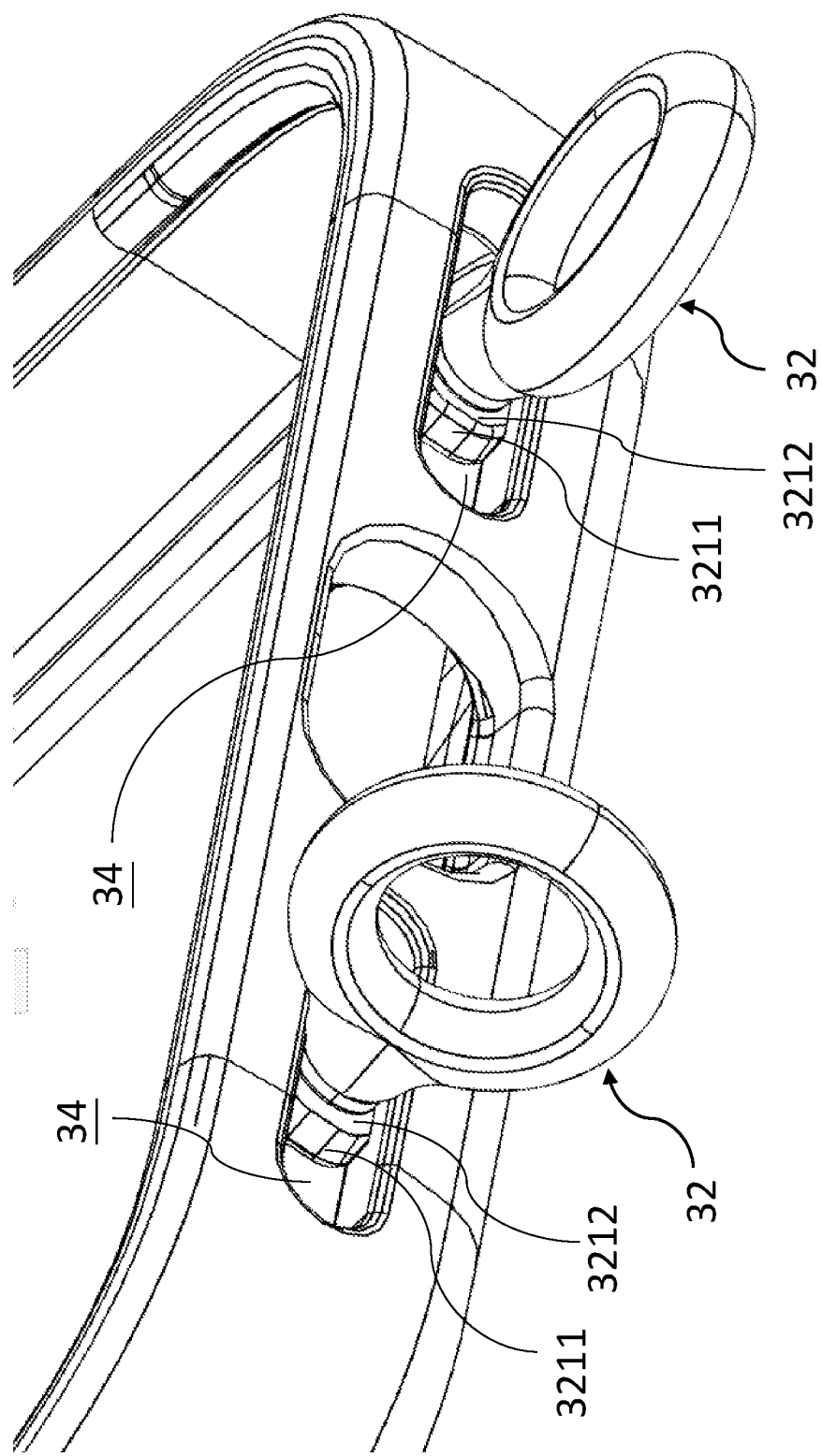
FIG. 3C is another perspective view of FIG. 3A.

Dissimilar to the previous two embodiments, in the third embodiment, the retaining space is formed on a central area of the slot, and the connector is designed to be in a way of "stepping" rotation in position, which is not like the "positioning feel" provided by the second embodiment using the way of rotating the connector about 90 degrees. In reference to FIGS. 3A, 3B and 3C, specifically, in the third embodiment, the head 3211 is preferably shaped as an octagon body. In the retaining space, each of the two opposing sidewalls 311 is provided with a polygonal wall 314 and a step 313 is formed thereon. The two polygonal walls 314 construe a shape corresponding to the head 3211 and have a distance therebetween greater than a distance between the two sidewalls 311. Therefore, when the fastening portion 321 is assembled within the retaining space 341, the head 3211 is adapted to fit onto the polygonal walls 314, and the head 3211 having a bottom 3212 is adapted to resist against the step 313, thereby the connector 32 is adapted to be positioned in the slot 34. This way, because the head 3211 is shaped octagon, after the user twists the connector 32 in two steps (each step will have a rotation about 45 degrees, in reference to the state on the right of FIGS. 3A and 3C which show the state before rotation, and in reference to the state on the left of FIGS. 3A and 3C which show the state after rotation), the head 3211 is rotated about 90 degrees in position. This design achieves an operational sense of step, and enhances the convenience and quality in use.

In the previous three embodiments, two connectors are independent of each other that can be separately moved or rotated. In the fourth embodiment, the two connectors are fixed into one piece which can be named an integral connecting device, in which each connector has the same form and position as those of the third embodiment, except each head 4211 is unable to be rotated in its corresponding retaining space 441 because the two heads 4211 of the two connectors 42 form a fixed relative position. Therefore, the head 4211 and its corresponding retaining space 441 do not have to be considered for a shape matching as those of the third embodiment do. Any alternatives, such as using a cylindrical head to fit arc walls defining the retaining space is feasible. If the lanyard ring 422 is required to perform the function of rotation, there can be additionally provided with rotating mechanism between the head 4211 and the neck 4212, or between the neck 4212 and the lanyard ring 422. The following just describes the basic model as to how the two connectors 42 are fixed together to perform the desired function to disclose the core technology of this embodiment, which does not limit any alternatives or equivalents.

Figure 4A:
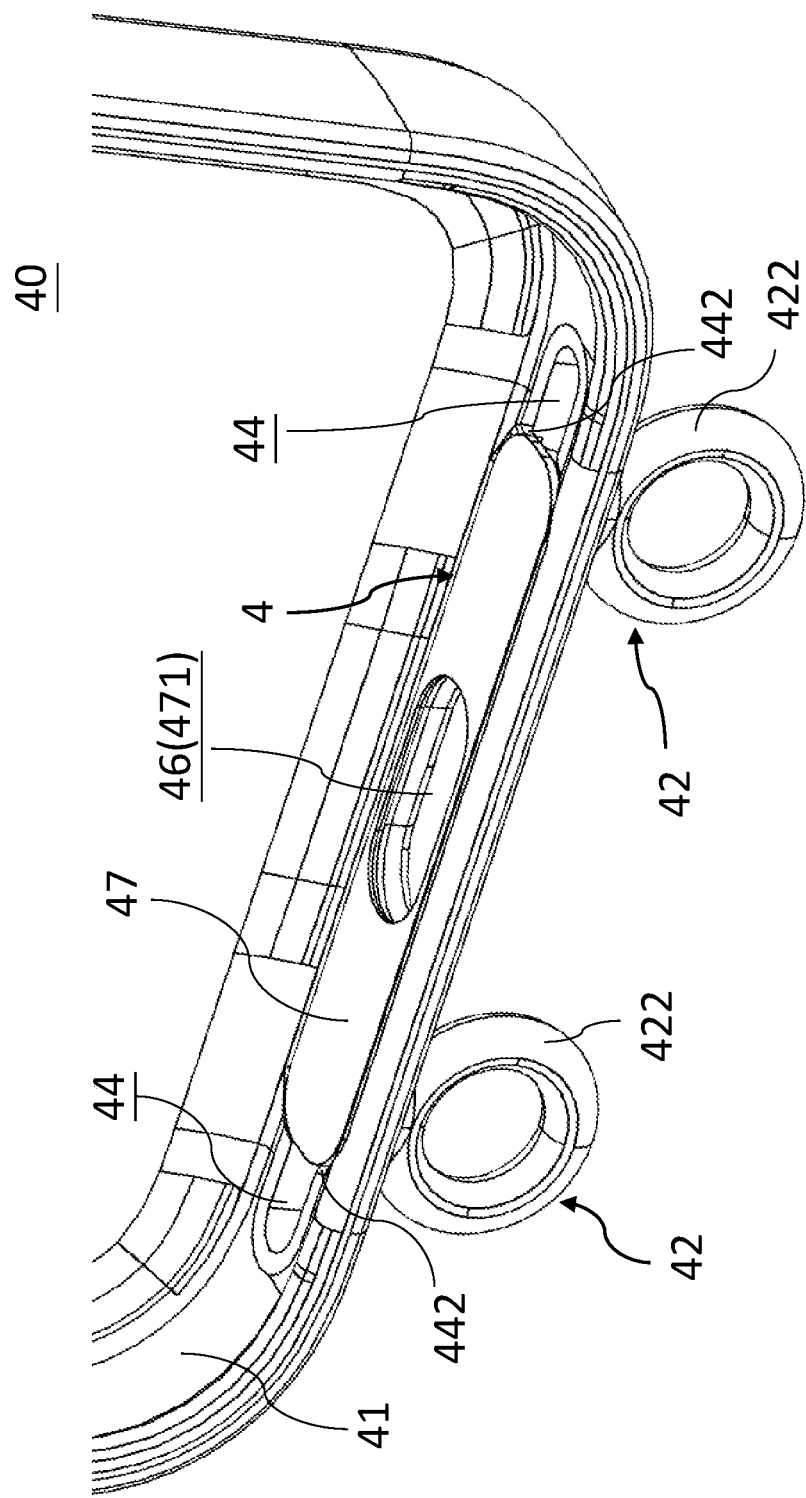
FIG. 4A is an enlarged partial view showing the fourth embodiment of this invention, wherein the connecting device is assembled with the retaining spaces of the audio slots, respectively.
Figure 4B:
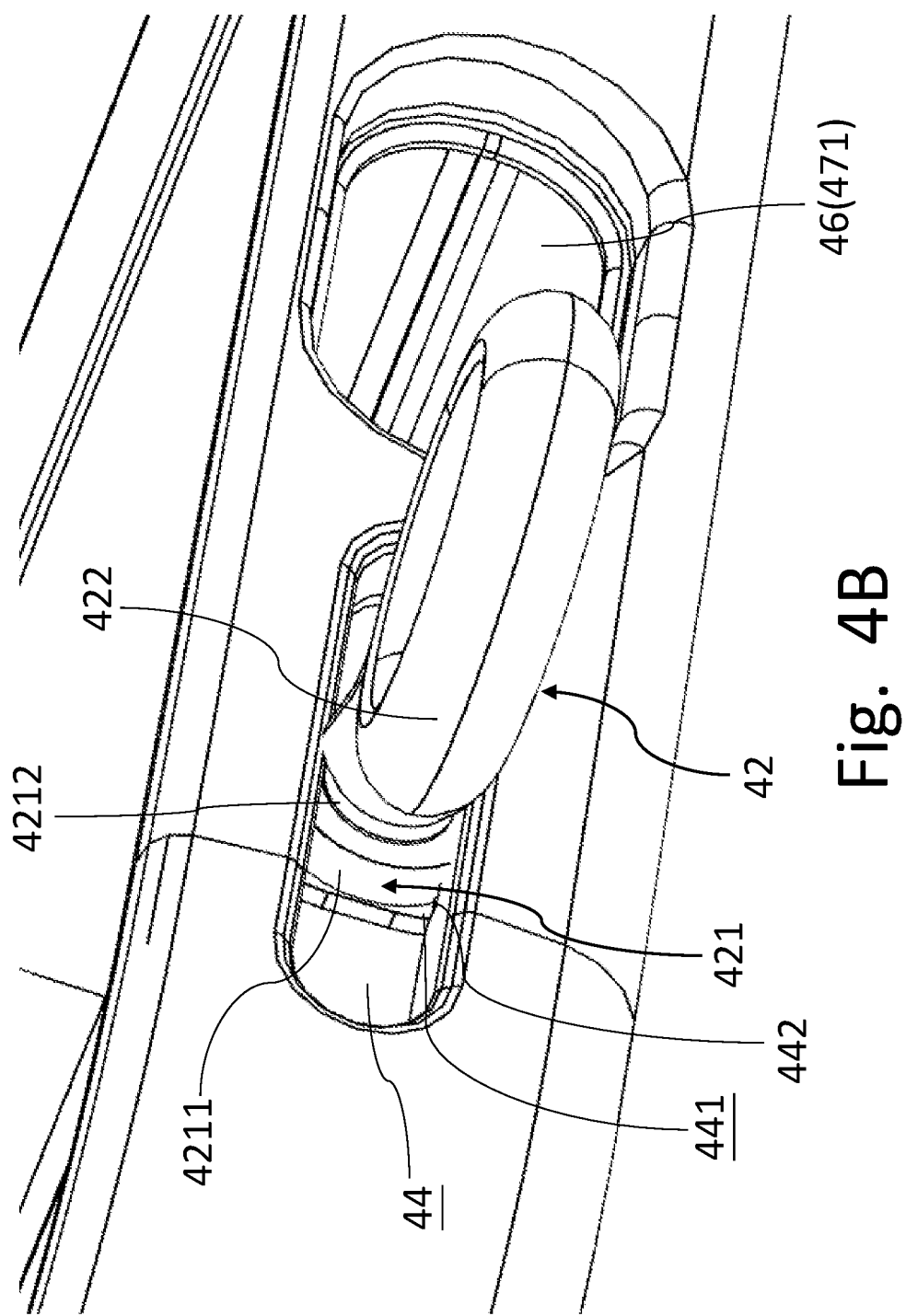
FIG. 4B is an enlarged partial view showing the connecting device which is placed in the audio slots in position.

In reference to FIGS. 4A and 4B, a connecting device 4 includes two connector 42 each having a fastening portion 421, a lanyard ring 422 extending from the corresponding fastening portion 421, and a bridge 47 connecting between the two fastening portions 421. The two connector 42 are assembled within the two audio slots 44 through the fastening portions engaged therein, respectively. The two lanyard rings 422 extend out of the two audio slots 44, thereby a lanyard (not shown) can pass through the two lanyard rings 422, respectively. Preferably, a charge/data slot 46 is further provided between the two audio slots 44, and the bridge 47 is formed with an aligning hole 471 which is correspondingly the same as the charge/data slot 46 in dimension and shape. Therefore, when the two fastening portions 421 engage within the two audio slots 44, respectively, the aligning hole 471 and the charge/data slot 46 are corresponding to each other and a user's plugging in and out a charging/data cable is not affected. In addition, after the connecting device 4 is assembled with the protective case 40, to avoid the bridge 47 extending inward too much from the frame of the case 40 that limits the space of the mobile phone to be accommodated, or scratches the surface of the phone, each audio slot 44 can be provided with a countersunk edge 442 at an upper periphery thereof to fit the profile of the bridge 47. After the two connectors 42 are assembled within the two audio slots 44, the bridge 47 can be in a complete or most surface-sunk status. Besides, to not block the sound passing through the two audio slots 44, the portion of the bridge 47 partially overlapping the two audio slots 44 can be formed with opening(s) or mesh holes (not shown) to reduce possible sound transmission loss.

On top of the above preferred embodiments carrying out the technical measures and acts of this invention, the following are some other feasible alternatives itemized to identify the equivalents that may not be literally set forth in the claims.

1) The diameter of the neck of the connector in each embodiment preferably ranges from 1 mm to 5 mm, and most preferably from 2.5 mm to 3.5 mm, so as to fit the width (about 1.5 mm to 6 mm) of the audio slot commonly formed for the phone case in the market. In principle, depending on the materials the connector and the phone case being made of, and the desired fitting tightness, the diameter of the neck can be slightly greater, equal to, or slightly smaller than the width of the slot, in order to seek for the best matching.

2) The head of the connector in each embodiment is preferably completely or partially embedded in the audio slot to form a countersunk head, in order to get a better fastening effect and reduce the friction with the phone for the unnecessary scratching.

3) The so-called "sense of stage" in the first and second embodiments is not limited to have the diameter of the retaining space be designed to be slightly greater than the distance between the two opposing sidewalls. The other alternative measures that can produce similar sense of stage and positioning result are feasible. For instance, the two sidewalls closing to the retaining space are formed being face-to-face projecting, thereby making the width W of the audio slot (i.e., the distance between the two sidewalls) is slightly shrunk at that place. The head passing through the shrunk area will soon enter into the retaining space in position, and cannot be separated therefrom again unless exerting a certain force. Because the sense of stage is produced owing to the existing shrunk area, whether the width of the retaining space is greater than the width W of the slot is not the point. That is, in the first embodiment for example, at a same height, the circular diameter W1 of the head 1211 can also be equal to the distance W of the two sidewalls 111 above the step 113. Of course, all the positioning measures to provide the "sense of stage" is not necessarily provided at the various distances between the upper sidewalls facing to the various diameters of the head only, varying the distances versus the neck diameters between the lower sidewalls only, or between both of the upper sidewall and the lower sidewall is feasible too.

4) The material of each connector is proposed to be selected a light-weight and hardness that can be subject to carry one-half of the weight of a common mobile phone or tablet without damage. Preferably, metal, plastic or silicone having a hardness ranging from Shore D65 to Shore D83 is suggested. The compatible protective case (or at least the sidewalls defining the slot) is (are) proposed to be selected from the material harder than the connector such as the hardness ranging from Shore D86 to Shore D90, so as to enhance the product reliability after being coupled with the connector. In addition, the upper surface of the head of the connector is proposed to be selected a softer material or made as smooth 3a as possible (e.g., rubber or a grinding surface) to avoid scratching the phone.

5) The material selected for making the connector or the protective case in not necessarily a single material. Complex material, different materials to be combined, or same material having different hardness by using a dual injection molding is feasible as well.

6) Under the circumstances of stabilizing the connector without being separated from the protective case, the part of the head is proposed to be made as small as possible to cover the audio slot at the least, thereby sound from and into the phone is less affected.

7) the connector can be designed as any possible shape or type that can match the slot inherently built-in or specially customized for the connector. The slot is not necessarily the audio slot, and located at the bottom frame. Any location can be considered to provide the slot, provided that the connector can be coupled with, and preferably by using the deformation of the soft material as selected to let the user to assemble and disassemble the connector from the protective case by himself/herself when not being in use.

8) The number of the connectors is not necessarily two (a pair) as shown the drawings, any reasonable numbers to hold a lanyard or lanyards are acceptable.

9) The lanyard ring of the connector is not necessarily shaped a closed loop as shown. Any other types that can retain a lanyard or its accessory can be the replacements.

10) The audio slot is not necessarily a hollow elongated shape. A part of the slot is meshed is feasible, provided that it is a hole that can receive and match the connector, and preferably can allow the connector to freely engage therewith and disengage therefrom.

What is claimed is:

1. A connector for connecting a lanyard to a protective case for housing a hand-held device, the protective case being formed with a slot; in which the connector includes:
   a fastening portion coupling with the slot;
   a lanyard ring, connected to the fastening portion and protruding out of the slot for the lanyard being disposed therethrough;
   wherein the slot is shaped elongated and provided with a step, thereby making the slot be a countersunk slot; when being installed from an inside of the protective case to an outside, the connector is adapted to resist against the step, thereby not falling out from the protective case.

2. The connector as claimed in claim 1, wherein the fastening portion detachably couples with the slot.

3. The connector as claimed in claim 2, wherein the slot is an audio slot formed on a frame of the protective case and corresponding to an audio device of the hand-held device, thereby sound is adapted to come out or into the hand-held device through the audio slot.

4. The connector as claimed in claim 3, wherein the frame is formed with a charge/data slot which is adjacent to the audio slot.

5. The connector as claimed in claim 1, wherein the fastening portion includes a head and a neck, in which the neck is between the head and the lanyard ring.

6. The connector as claimed in claim 5, wherein the slot is defined two opposing sidewalls and two opposing end portions.

7. The connector as claimed in claim 6, wherein the two sidewalls and two end portions are continuously provided with the step, thereby forming the slot to be shaped as the countersunk slot; when the fastening portion is assembled in the slot, the head is mostly embedded in the slot, and a bottom of the head is abutted against the step to prevent the connector from leaving out of the protective case.

8. The connector as claimed in claim 7, further comprising a retaining space formed on any portion of the slot to provide the connector to be positioned therein.

9. The connector as claimed in claim 8, wherein the head is shaped a conical body.

10. The connector as claimed in claim 9, wherein the retaining space is shaped being conically curved and corresponding to the head, and the retaining space is formed on one of the two end portions.

11. The connector as claimed in claim 10, wherein at a same height, the head has a circular diameter which is substantially the same as an arc diameter of the retaining space, and slightly greater than a distance between the two sidewalls above the step.

12. The connector as claimed in claim 8, wherein the head is shaped an elliptical body which, at a same height, has a minor axis and a major axis slightly greater than the minor axis.

13. The connector as claimed in claim 12, wherein the retaining space is defined by a multi-curvature surface, and formed on one of the two end portions, and wherein the retaining space is continuously defined by two first wall sections, two second wall sections and a third wall section, in which the two first wall sections are merged with the two sidewalls of the slot, respectively, and the two first wall sections oppose to each other and each has an arc shape; the two second wall sections connect with the first two wall sections, respectively, and the third wall section connects between the two second wall sections.

14. The connector as claimed in claim 13, wherein at the same height, the major axis of the head is substantially the same as a distance between two first wall sections, and greater than a distance between one of the first wall section and the opposing second wall section thereof; wherein the minor axis of the head is substantially not greater than a distance between the two sidewalls above the step.

15. The connector as claimed in claim 6, wherein the head is shaped an octagon conical body.

16. The connector as claimed in claim 15, further comprising a retaining space formed between the two opposing sidewalls.

17. The connector as claimed in claim 16, wherein in the retaining space, the two sidewalls each being provided with a polygonal wall and a step formed on the polygonal wall; and the two polygonal walls having a distance greater than a distance between the two sidewalls, whereby when the fastening portion is assembled in the retaining space, the head is adapted to fit onto the polygonal walls, and the head having a bottom being stopped by the steps, thereby the connector is adapted to be positioned in the slot.

18. A protective case of a hand-held device, comprising a connector for connecting a lanyard, in which the protective case is formed with a slot, and the connector includes:
   a fastening portion coupling with the slot;
   a lanyard ring, connected to the fastening portion and protruding out of the slot for the lanyard being disposed therethrough;
   wherein the slot is shaped elongated and provided with a step, thereby making the slot be a countersunk slot; when being installed from an inside of the protective case to an outside, the connector is adapted to resist against the step, thereby not falling out from the protective case.

19. A connecting device used to retain a lanyard onto a protective device of a hand-held device, in which the protective case is provided with two slots formed thereon; the connecting device comprising:

two connectors each having a fastening portion and a lanyard ring connected thereto, wherein the two connectors are assembled onto the two slots through the two fastening portions, and the two lanyard rings protrude out of the two slots, respectively, thereby the lanyard is adapted to be placed through the two lanyard rings; and a bridge, connected between the two fastening portions; wherein each of the slots is provided with a countersunk edge at an upper periphery thereof to fit a profile of the bridge, thereby after the two connectors are assembled within the two slots, the bridge is adapted to be in a complete or most surface-sunk status.

20. The connecting device as claimed in claim 19, wherein the two fastening portions are detachably assembled with the two slots, respectively.

21. The connecting device as claimed in claim 20, wherein the slots each is an audio slot formed on a frame of the protective case and corresponding to an audio device of the hand-held device, thereby sound is adapted to come out or into the hand-held device through the audio slot.

22. The connecting device as claimed in claim 20, wherein the frame is provided with a charge/data slot formed between the two audio slots, and wherein the bridge is formed with an aligning hole having a shape and dimension substantially with a shape and dimension of the charge/data slot, thereby when the two fastening portions are assembled with the two slots, the aligning hole and the charge/data slot are corresponding to each other.

23. The connecting device as claimed in claim 22, wherein each of the fastening portions has a head, and a neck between the head and corresponding lanyard ring.

24. The connecting device as claimed in claim 23, wherein each of the slots is shaped elongate, and defined by two opposing sidewalls and two opposing end portions.

25. The connecting device as claimed in claim 24, further comprising two retaining spaces, one of which is formed between the two sidewalls of one of the slots, and the other of which is formed between the two sidewalls of the other of the slots.

26. The connecting device as claimed in claim 25, wherein in each of the retaining spaces, the two opposing sidewalls are provided with steps and walls shaped being corresponding to a shape of the head, and the two sidewalls have a distance in the retaining space greater than a distance out of the retaining space; when each of the fastening portions is assembled with the corresponding retaining space thereof, the head is adapted to fit onto the corresponding two sidewalls, and a bottom of the head resists against the steps, thereby the connector is adapted to be positioned in the corresponding slot.

27. A protective case used for a hand-held device, including a connecting device for connecting a lanyard, in which the protective case is formed with two slots, and the connector device includes:

two connectors each having a fastening portion and a lanyard ring connected thereto, wherein the two connectors are assembled onto the two slots through the two fastening portions and the lanyard rings protrude out of the two slots, respectively, thereby the lanyard is adapted to be placed through the lanyard rings; and a bridge, connected between the two fastening portions; wherein each of the slots is provided with a countersunk edge at an upper periphery thereof to fit a profile of the bridge, thereby after the two connectors are assembled within the two slots, the bridge is adapted to be in a complete or most surface-sunk status.

28. The connector as claimed in claim 1, wherein the connector is adapted to be moved and positioned in the slot.

29. The protective case of a hand-held device as claimed in claim 18, wherein the slot is defined two opposing sidewalls and two opposing end portions.

30. The protective case of a hand-held device as claimed in claim 29, further comprising a retaining space formed on any portion of the slot, thereby the connector is adapted to be moved in the slot and positioned in the retaining space.

31. The protective case of a hand-held device as claimed in claim 30, wherein the retaining space is formed on one of the opposing end portions.

32. The protective case of a hand-held device as claimed in claim 30, wherein the fastening portion includes a head and a neck, in which the neck is between the head and the lanyard ring.

* * * * *